United States Patent [19]

Mitchell et al.

[11] Patent Number: 5,247,414
[45] Date of Patent: Sep. 21, 1993

[54] INTEGRATED THIN FILM MAGNETIC HEAD WITH PLANAR STRUCTURE

[75] Inventors: Terry Mitchell, St. Louis Park; William P. Wood, Edina; Paul Michalek, Bloomington, all of Minn.

[73] Assignee: North American Philips Corporation, New York, N.Y.

[21] Appl. No.: 811,559

[22] Filed: Dec. 20, 1991

Related U.S. Application Data

[63] Continuation-in-part of Ser. No. 717,301, Jun. 18, 1991.

[51] Int. Cl.5 .................. G11B 5/265; G11B 5/31
[52] U.S. Cl. ................................ 360/121; 360/126
[58] Field of Search ............... 360/121, 126; 29/603

[56] References Cited

U.S. PATENT DOCUMENTS

| 4,517,616 | 5/1985 | Bischoff | 360/126 |
| 4,872,079 | 10/1989 | Roberts | 360/126 |
| 5,014,414 | 5/1991 | Matsuzawa et al. | 360/121 |
| 5,027,245 | 6/1991 | Nagata et al. | 360/121 |
| 5,042,140 | 8/1991 | Coutellier et al. | 360/122 |

Primary Examiner—Robert S. Tupper
Attorney, Agent, or Firm—John C. Fox

[57] ABSTRACT

Thin film magnetic head structure includes digital read/write heads and analog read heads integrated on a single substrate. The "wrap around pole effect" is reduced or eliminated by having the thicknesses of the digital lower flux guides and the analog read gap-defining layer approximately the same, resulting in improved signal output from the digital read heads. The structure is useful in cassette decks designed to play both digital and analog compact cassettes.

5 Claims, 3 Drawing Sheets

INTEGRATED THIN FILM MAGNETIC HEAD WITH PLANAR STRUCTURE

CROSS REFERENCE TO RELATED APPLICATIONS

This application is a continuation-in-part of U.S. patent application Ser. No. 717,301, filed June 18, 1991.

BACKGROUND OF THE INVENTION

This invention relates to thin film magnetic heads, and more particularly relates to thin film structures in which two or more different heads, such as analog and digital heads, are integrated on a single substrate.

The continuing trend of miniaturization of electronic components includes magnetic heads for reading and/or writing information on magnetic media such as tape. For example, the recently proposed format for compressed digital audio tape, known as digital compact cassette or "dcc", employs tape of the same size as that used for the standard analog format known as compact cassette. However, instead of having four tracks, as does the compact cassette, the dcc tape has eighteen tracks, thus placing stringent demands on the magnetic heads which will write and read these tracks.

For example, in designing read and write heads for the dcc format, alignment of the read and write heads on the tracks is of major concern. In order to avoid reading of adjacent tracks due to tape alignment errors, the write head in such structures is typically wider than, for example, more than twice the width of, the read head. As further assurance against misalignment of the read and write heads, it has been proposed to combine these heads in a single, integrated thin film structure, such as that described and claimed in commonly assigned copending U.S. patent application Ser. No. 703,539, filed May 21, 1991.

This integration in turn creates new concerns. For example, a problem associated with such a combined digital head structure is a signal loss occurring during reading when the center of the read head is laterally displaced from the center of the tape track, even though the read head is still entirely within the bounds of the track. In parent application Ser. No. 717,301, the specification of which is incorporated herein by reference, this problem is attributed to the so-called "wrap around pole effect", in which the layers of the thin film structure above the relatively narrow layer or layers which define the width of the read head "wrap around" these relatively narrow layers, causing a vertical offset of the outer portions of the write gap, with respect to the central portion of the write gap situated above these relatively narrow layers. The parent application teaches combined read/write thin film digital head structures which substantially eliminate this "wrap around pole effect".

A significant advantage of using the same size tape as is used for the compact cassette is that the dcc cassettes and decks can be designed so that the decks are compatible with existing compact cassettes. Thus, consumers will be able to play their existing collections of compact cassettes as well as the new dcc cassettes on the new dcc decks. To achieve this compatibility, the dcc decks will have to incorporate analog read heads.

In order to preserve the advantages of integration already envisioned for the digital heads, various designs have been proposed in which the digital and analog heads are integrated on a single substrate. See, for example, copending U.S. patent application Ser. No. 919,507 (PHN 12816B), filed Jul. 24, 1992, a continuation of Ser. No. 795,280, filed Nov. 19, 1991, a continuation of Ser. No. 473,085, filed Jan. 30, 1990.

In one embodiment, a row of nine digital heads is arranged on one side of the substrate, for reading and/or writing nine digital tracks on one half of a digital tape, and two analog heads are arranged on the other side of the substrate, for reading one half of an analog tape, in one direction of tape travel. For reading and/or writing in the reverse direction, the head is rotated 180 degrees.

A portion of such an integrated head structure 10, viewed in a direction normal to the head face, is shown in FIG. 1. Located adjacent one another on a common substrate 12 of a non-magnetic material are digital and analog heads 14 and 16, respectively. Digital head 14 is a combined read/write head including lower flux guide 18 of the read portion, which conducts magnetic flux from the tape to an inwardly located magnetoresistive sense element (not shown). This lower flux guide typically has a thickness of about 0.4 microns, chosen for minimization of steps, which could lead to discontinuities in the overlying test/bias conductor. See co-pending U.S. patent application Ser. No. 703,539. The adjacent analog read head 16 includes lower flux guide 20, also having a thickness of about 0.4 microns, chosen for the same reason. Formed on top of these flux guides is an electrically insulating layer 22, typically of an oxide such as $Al_2O_3$, in a thickness suitable to form the read gap 22A of the digital head, typically 0.4 microns. Because this layer 22 is too thin to form the analog read gap, a second electrically insulating layer 23 is formed on layer 22. The combined thickness of layers 22 and 23 define the analog read gap 23A. Following this, the upper flux guide 24 of the analog read head is formed. The read portion of the digital head 14 is completed with upper flux guide 28. This flux guide 28 also serves as the lower flux guide for the write portion of the head, and thus is sometimes referred to as the shared flux guide. Write gap-defining oxide layer 30 and upper flux guide 32 complete the write portion of the structure.

Since the width of the write gap is defined by the width of the flux guides 28 and 32, the write gap could have a step or offset Δ between central region 30A and side regions 30B and 30C, caused by the conformance of layers 22 and 23 to flux guide 18, leading to the wrap around pole effect referred to above. Thus, in accordance with the teachings of parent application Ser. No. 717,301, this offset Δ can be avoided by selecting the same thickness for the digital lower flux guide layer 18, and insulating layers 22 and 23, and by selectively etching the portion of layer 23 overlying flux guide 18, thereby providing an approximately planar surface for the formation of the subsequent layers of the digital head. However, some variations in layer thicknesses due to process variations are practically unavoidable, resulting in some offset. Offsets as small as 0.3 micron can have a significant wrap around pole effect on head output.

OBJECTS AND SUMMARY OF THE INVENTION

It is an object of the invention to reduce or eliminate the offset in the digital write gap of an integrated thin film magnetic head structure in which at least one digital read/write head and one analog read head are integrated on a single substrate.

It is another object of the invention to reduce or eliminate such an offset without introducing additional layers or fabrication steps to such a structure.

In accordance with the invention, the thickness of the lower flux guides of the digital head is chosen to be the same as the thickness of the analog read gap. Thus, a single insulating layer on the analog lower flux guide and the exposed portions of the substrate surrounding the digital flux guide, defines the analog read gap and provides a planar or nearly planar surface for the formation of subsequent layers. This eliminates the need for two seperate insulating layers to define the read gap, thus reducing the incidence of thickness errors due to unavoidable process variations, and providing a more nearly planar surface for subsequently formed overlying layers.

More specifically, the invention relates to a thin film magnetic head structure having at least one digital read/write head and at least one analog read head integrated on a single substrate, the structure having a single head face. As viewed in a direction normal to the head face, the structure has: for each head, a lower flux guide located on the substrate; a first electrically insulating layer covering the analog head lower flux guide and the exposed portions of the substrate, but leaving exposed the digital head lower flux guide, the first electrically insulating layer defining the read gap of the analog head; a second electrically insulating layer at least covering the digital head lower flux guide and defining the read gap of the digital head; for each head, an upper flux guide located above the lower flux guide on the respective read gap-defining insulating layer; a third electrically insulating layer defining a digital write gap above each digital read gap; and for each digital head, a top flux guide above the upper flux guide on the third write gap-defining insulating layer;

characterized in that the thicknesses of the digital lower flux guide and the first read gap-defining insulating layer are approximately the same, for example, approximately 0.8 microns.

By using a single insultating layer to define the analog read gap, the "wrap around pole effect" is thus further reduced or eliminated, resulting in improved signal output from the digital read heads. The structure is useful in cassette decks designed to play both digital and analog compact cassettes.

In accordance with a preferred embodiment of the invention, the thickness of the analog head lower flux guide is approximately the same as the digital head lower flux guide.

In accordance with another preferred embodiment, the structure includes nine digital heads arranged in a row on one half of the substrate, and two analog heads arranged in a row on the other half of the substrate.

DESCRIPTION OF THE PREFERRED EMBODIMENTS

Figure 2:
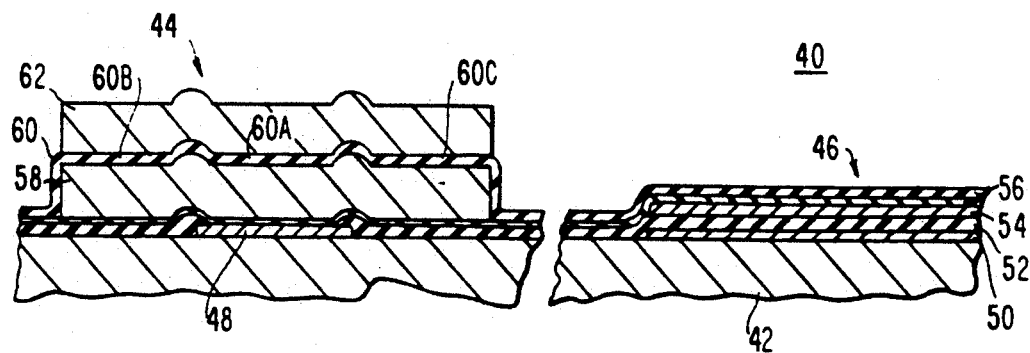
FIG. 2 is a view similar to that of FIG. 1, in which the digital head lower flux guide and the analog head read gap-defining layer have approximately the same thicknesses.

Referring now to FIG. 2, a view along the normal to the head face of a portion of an integrated thin film magnetic head structure 40 according to the invention, including on a single non-magnetic substrate 42 a digital read/write head 44 and a portion of an analog read head 46. Defining the width of the read portion of head 44 and head 46 are lower flux guides 48 and 50, respectively, which can be conveniently formed by applying a single layer of magnetically permeable material such as permalloy over the entire surface of the substrate and then patterning the layer, such as by selective etching. An electrically insulating layer 52, typically of an oxide such as $Al_2O_3$, covers these lower flux guides and the exposed areas of the substrate 42, except that the portion of layer 52 covering digital lower flux guide 48 has been removed, for example, by selective etching.

According to the invention, flux guide 48 and insulating layer 52 are approximately the same thickness. Preferably, the difference in thicknesses of these layers should be no greater than 0.1 micron, and ideally should be zero. Thus, a planar or nearly planar surface is provided for support of the subsequently formed overlying layers, without the need for any additional layers or fabrication steps.

Figure 1:
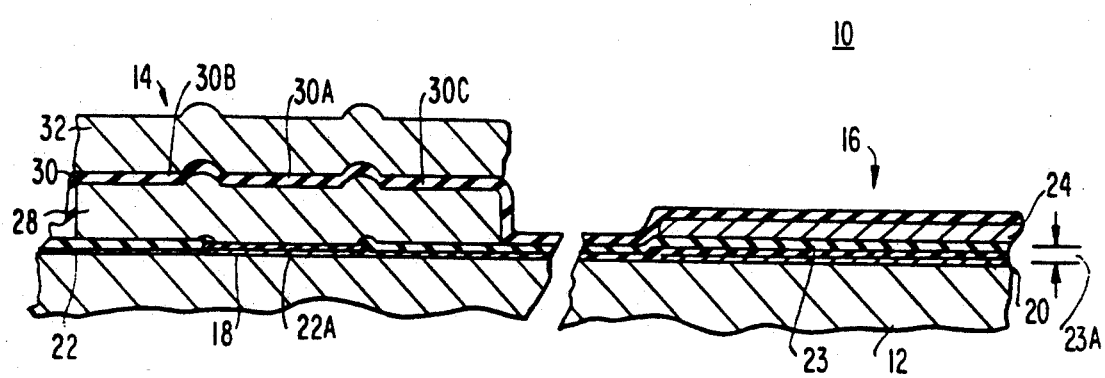
FIG. 1 is a diagrammatic elevation view of a portion of the head face of an integrated thin film magnetic head structure, viewed normal to the head face, showing a digital read/write head and a portion of an analog read head.

Layer 52 determines the thickness of the analog read gap, while the lower flux guides conduct magnetic flux from the magnetic tape on the head surface to a magnetoresistive sensing element located inwardly from the head face (and thus not shown in FIG. 2). The substrate is shown as being uniform, but as will be appreciated, its surface may be covered with one or more surface-smoothing layers to support the MRE elements, as well as an insulating layer on top of the MRE. While this insulating layer generally extends to the head face, for the sake of simplicity, it is not shown in FIGS. 1 and 2.

Next, the upper flux guide 54 for the analog read head is formed on top of layer 52, after which electrically insulating layer 56 is formed. This layer 56 defines the thickness of the digital read gap, and thus its thickness is also critical to the achievement of the desired output characteristics. By way of example, this thickness is 0.4 microns when the thickness of layer 52 is 0.8 microns. In order to conserve on the number of patterning steps required during fabrication, this layer covers the entire surface of the structure as defined so far by the various underlying layers.

Upper flux guide 58, formed to overlie lower flux guide 48, completes the read portion of the digital read/write head. In this embodiment, upper flux guide 58 also serves as the lower flux guide for the write portion of the head 44, and thus its width is determined by the desired (greater) width of the write head. By way of example, for a read gap thickness of 0.4 microns, the widths of the lower and upper flux guides are about 70 and 185 microns, respectively.

Next formed over the entire surface is insulating layer 60, which serves to define the thickness of the digital write gap. For the exemplary dimensions already given for the other layers, the thickness of this layer is about 0.7 microns. Top flux guide 62, having about the same width as the upper (shared) flux guide 58, completes the structure.

Because of the improved planarity established in the layers 48 and 50 on the substrate, the offset Δ between the central portion 60A and the outlying portions 60B and 60C of the write gap has been reduced in FIG. 2 essentially to zero. The effect of the offset Δ on output of the digital read head can be seen graphically in FIGS. 4 and 5, where output (in arbitrary units) is plotted versus track offset (in millimeters) for heads of the type shown in FIGS. 1 and 2, in which the thickness of the digital lower flux guides is about 0.8 microns, but whose offsets Δ are about 0.3 microns and less than 0.1 micron, respectively.

Figure 4:
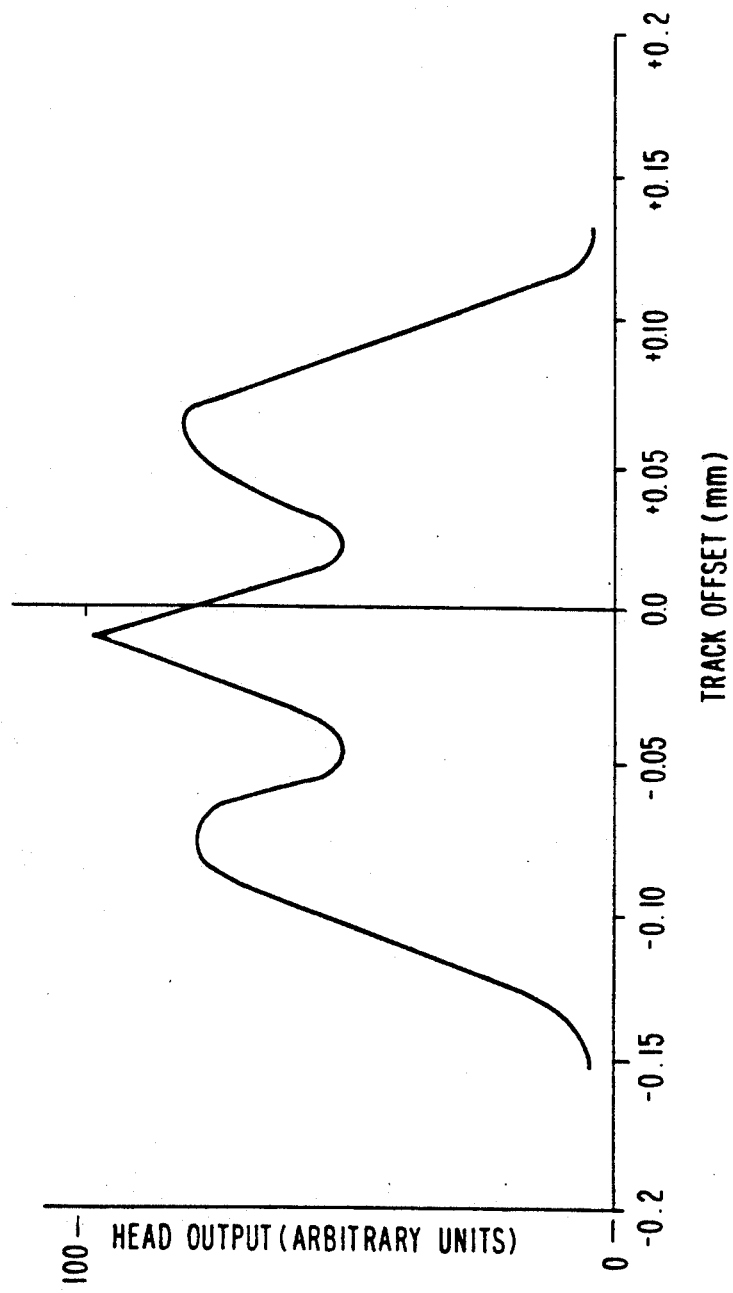
FIGS. 4 and 5 are track scans showing graphically the variation of output (in arbitrary units) with track offset (in millimeters) of the digital read head from the center of the tape track, for digital heads of the type shown in FIGS. 1 and 2, respectively.
Figure 5:
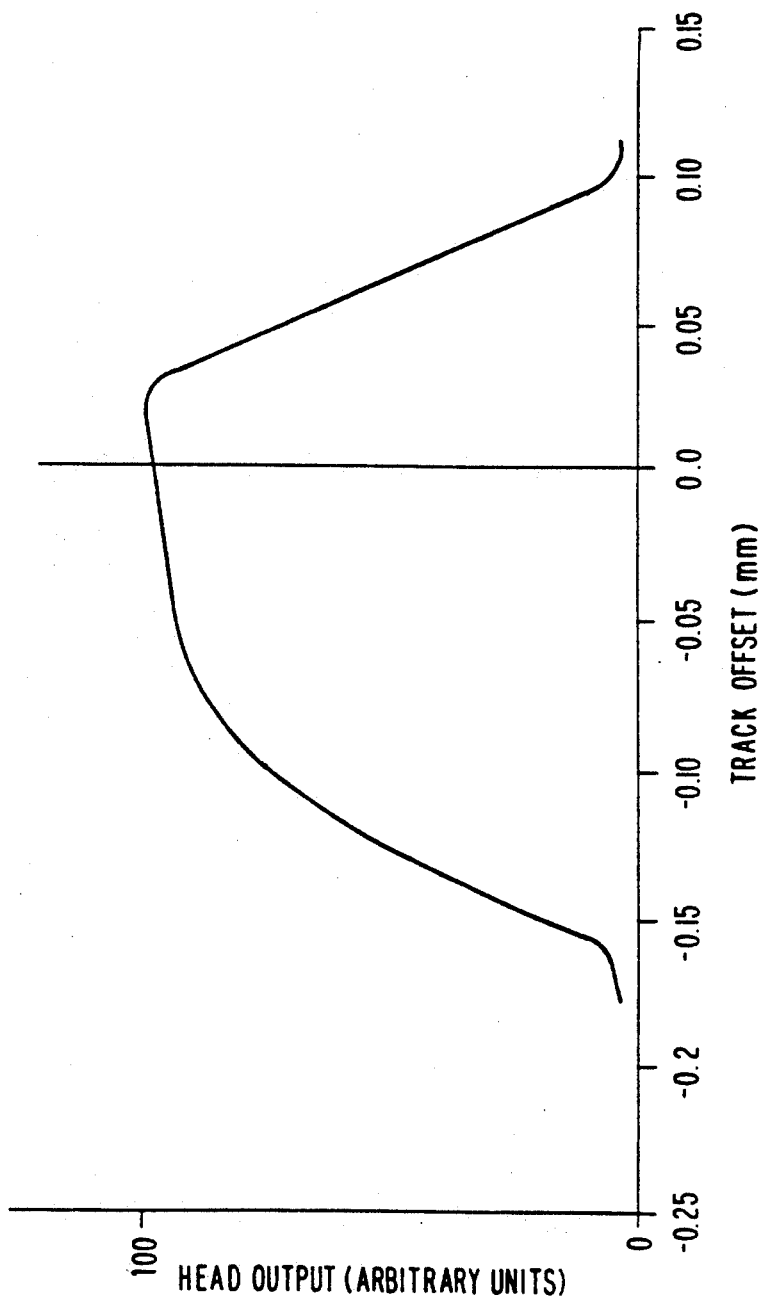

Track offset is defined as the lateral distance between the center of the read gap and the centerline of the tape track being read, and is thus different from the vertical offset Δ in the digital write gap. As may be seen by comparing FIGS. 4 and 5, reduction of the offset Δ results in a significantly slower fall-off in output with increasing track offset. Thus, FIG. 5 shows practically no fall-off from the peak value within about plus 0.03 to minus 0.07 millimeters track offset, while FIG. 4 shows a rapid and significant fall-off in both positive and negative directions, followed by a recovery to about 80 percent of peak, followed by a resumption of the rapid fall-off at about plus 0.06 and minus 0.08 millimeters track offset.

Figure 3:
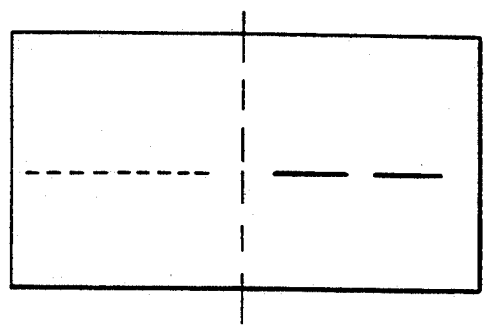
FIG. 3 is a diagrammatic plan view of an integrated thin film magnetic head structure of the invention, having nine digital heads in a row on one half of the substrate, and two analog heads in a row on the other half of the substrate.

FIG. 3 is a diagrammatic plan view of one embodiment of an integrated thin film magnetic head structure of the invention, in which a row of nine digital read/write heads, represented as dashes, are arranged on one half of a head substrate, and a row of two analog read heads, also shown as dashes, is arranged on the other half.

The invention has been described in terms of a limited number of embodiments. Other embodiments and variations of embodiments which are within the scope of the invention as described and claimed herein, will become readily apparent to those skilled in the art.

We claim:

1. A thin film magnetic head structure having at least one digital read/write head and at least one analog read head integrated on a single substrate, the structure having a single head face, the structure as viewed in a direction normal to the head face having: for each head a lower flux guide located on the substrate; a first electrically insulating layer covering the exposed portions of the substrate and the analog head lower flux guide, but leaving exposed the digital head lower flux guide, the first electrically insulating layer defining the read gap of the analog head; for the analog read head, an upper flux guide located above the lower flux guide on the first electrically insulating layer; a second electrically insulating layer covering the analog read head upper flux guide, the digital head lower flux guide and exposed portions of the first electrically insulating layer, and defining the read gap of the digital head; for the digital read head, an upper flux guide located above the lower flux guide on the second read gap-defining insulating layer; a third electrically insulating layer on the digital read head upper flux guide, the third insulating layer defining a digital write gap above the digital read gap; and for the digital head a top flux guide above the upper flux guide on the third write gap-defining insulating layer;
   the thicknesses of the digital read head lower flux guide and the first read gap-defining insulating layer being approximately the same.

2. The thin film magnetic head structure of claim 1 in which the difference in thicknesses of the digital read head lower flux guide and the analog read head gap-defining layer is 0.1 micron or less.

3. The thin film magnetic head structure of claim 1 in which the thickness of the analog head lower flux guide is approximately the same as the digital head lower flux guide.

4. The thin film magnetic head structure of claim 1 in which there are nine digital heads arranged in a row, and two analog heads arranged in a row.

5. The thin film magnetic head structure of claim 2 in which the thicknesses of the digital head lower flux guide and the first read gap-defining insulating layer are approximately 0.8 microns.

* * * * *